Dec. 15, 1925.
C. C SPREEN
1,566,255
REFRIGERATING APPARATUS
Filed Oct. 13, 1923
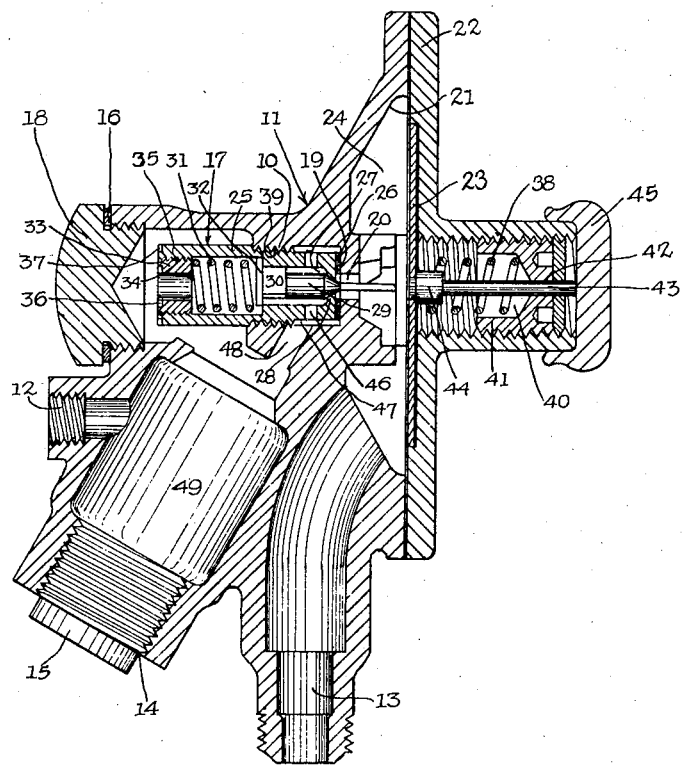
CHARLES C. SPREEN
INVENTOR
By [signature]
ATTORNEYS Patented Dec. 15, 1925.

1,566,255

UNITED STATES PATENT OFFICE.

CHARLES C. SPREEN, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

REFRIGERATING APPARATUS.

Application filed October 13, 1923. Serial No. 668,358.

*To all whom it may concern:*

Be it known that I, CHARLES C. SPREEN, a citizen of the United States, residing at Detroit, in the county of Wayne and State of Michigan, have invented a certain new and useful Improvement in Refrigerating Apparatus, of which the following is a full, clear, and exact description, reference being had to the accompanying drawings.

This invention relates to refrigerating apparatus and particularly to the pressure reducing or expansion valve employed for admitting the refrigerant liquid into the expansion coil at the rate suitable for efficient refrigeration. The object of this invention is to provide a new and improved valve for this purpose. In the drawings accompanying this specification and forming a part thereof I have shown, for purposes of illustration, one form which my invention may assume. In these drawings:

Figure 1 represents a central section through this illustrative embodiment of my invention.

The form of my invention herein shown comprises a casing 11 provided with an inlet 12 arranged to be connected to the condensing coil of the refrigerating system, an outlet 13 arranged to be connected to the expansion coil of the refrigerating system, a cleaning opening 14 affording access to the inlet chamber 49 and normally closed by means of a plug 15, an opening 16 for insertion of the valve unit 17 and normally closed by means of a plug 18, an annular shoulder 19 arranged to cooperate with the valve unit 17 and forming a restricted passage 20, and an open face 21 adapted to be closed by means of a plate 22 arranged to support a suitable diaphragm 23 within the diaphragm chamber 24 defined by the face 21 and the plate 22.

The valve unit 17 herein shown comprises a housing 25 arranged to be held in position within the casing 11 by engagement of screw threads 39 carried by the housing 25 with cooperating screw threads 10 carried by the casing 11 and when so positioned to tightly engage the annular shoulder 19 through a packing ring 26 and thus connect the aperture 20 to the aperture 27 in a valve seat 28 formed integral with the housing 25. This valve unit 17 also includes a valve 29 arranged to seat in and close the opening 27 within the valve seat 28 and supported by means of a triangular member 30 integral with the valve 29 and slidably mounted within the housing 25. The valve 29 is urged to seating position by a spring 31 compressed between a plate 32 which abuts the triangular portion 30 of the valve 29 and an annular plug 33 positioned within the housing 25 and maintained in position by engagement of its screw threads 34 with cooperating screw threads 35 carried by the housing 25.

The annular plug 33 and the housing 24 are herein shown as provided with recesses 36 and 37 adapted to be engaged by suitable wrenches while the housing 25 is shown as provided with a plurality of apertures 46 communicating with an annular recess 47 surrounding the valve housing 25 within the casing 11 and itself communicating with a passage 48 leading into the inlet chamber 49.

The valve 29 is reciprocated away from the valve seat 28 against the action of the spring 31 by means of the diaphragm 23 acting in response to the combined influence of a spring 38 and the change in pressure within the diaphragm chamber 24, the spring 38 being mounted within a tubular extension 40 formed integral with the plate 22 and herein shown as partially closed by means of a plug 41 apertured at 42 to permit projection therethrough of a stem 43 secured to a boss 44 mounted upon the rear of the diaphragm 23 while the extension 40 is completely closed by means of a cap 45 overlying the extension 40 and the plug 41 and the stem 43.

In operation the aperture 46, recess 47, and passage 48 will cause the refrigerant fluid to eddy and swirl through the interior of the valve unit 17 and constantly scavenge and clean the parts contacted to thus maintain clean the parts within the housing 25 and delay the corrosion and deterioration of the valve seat 28 and valve 29. However, when there occurs sufficient corrosion or deterioration of the valve 29 or valve seat 28 to cause the valve 29 to stick to the valve seat 28 the two members may be readily separated without opening the refrigerating system in any way by removing the cap 45 and pressing on the exposed end of the stem 43 to thus force the diaphragm 23 to operate the valve 49, while upon such corrosion or deterioration as necessitates repair of the valve 29 or valve seat 28 the valve unit 17 may be readily removed without removing the valve assembly from the system by merely removing the cap 18 and inserting a suitable wrench in the recess 37, and upon such corrosion or deterioration as necessitates replacement of the valve 29 or valve seat 28 the valve unit 17 may be similarly removed and then replaced by a new unit without any necessity for replacement of the remainder of the valve assembly.

It will be apparent from the above description that there will be maintained within the inlet valve 49 and the space within the valve unit 17 a continual swirl of refrigerant fluid which will maintain clean the interior of the valve unit 17; that the valve mechanism may be repaired or removed by merely removing the valve unit 17 without the necessity for disconnecting the valve casing from the remainder of the refrigerating system or the expense of replacing the entire valve assembly; and that there is provided a ready means for manually and positively actuating the diaphragm and the valve when the force of the diaphragm has become insufficient to open the valve because of defective action of the valve as because of corrosion.

It will be obvious to those skilled in the art that the particular forms of my invention herein shown and described may be variously modified and changed without departing from the scope of my inventive concept or sacrificing the advantages to be obtained therefrom and it will therefore be obvious that the disclosure herein is illustrative only and my invention not limited thereto.

I claim:

An expansion valve comprising a diaphragm, a casing member having a portion of appreciable thickness and an aperture through said portion, and having also an inner face concentric with said aperture and formed and arranged to closely engage one face of said diaphragm except over the area of said aperture, a spring disposed within said aperture having one end engaging the exposed portion of said face of said diaphragm and normally effective to move said diaphragm from said member, an abutment engaging the remote end of said spring, adjustably mounted in said aperture, and itself provided with a bore therethrough, an instrument extending through said bore and engaging said diaphragm and effective to forcibly move said diaphragm from said member, and means arranged to normally overlie said bore and said instrument removable to permit operation of said instrument.

In testimony whereof, I hereunto affix my signature.

CHARLES C. SPREEN.